(12) United States Patent
Toda et al.

(10) Patent No.: US 8,880,076 B2
(45) Date of Patent: Nov. 4, 2014

(54) TERMINAL AND QUALITY TRANSMISSION METHOD

(75) Inventors: Takashi Toda, Ishikawa (JP); Takashi Iwai, Ishikawa (JP); Akihiko Nishio, Kanagawa (JP); Takashi Tamura, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 13 days.

(21) Appl. No.: 13/819,236

(22) PCT Filed: Jan. 17, 2012

(86) PCT No.: PCT/JP2012/000236
§ 371 (c)(1),
(2), (4) Date: Feb. 26, 2013

(87) PCT Pub. No.: WO2012/105167
PCT Pub. Date: Aug. 9, 2012

(65) Prior Publication Data
US 2013/0157665 A1    Jun. 20, 2013

(30) Foreign Application Priority Data
Jan. 31, 2011   (JP) .................................. 2011-017932

(51) Int. Cl.
*H04W 36/00* (2009.01)
*H04W 36/30* (2009.01)
*H04W 28/24* (2009.01)

(52) U.S. Cl.
CPC .............. *H04W 36/30* (2013.01); *H04W 28/24* (2013.01)
USPC ........................... 455/436; 455/437; 370/252

(58) Field of Classification Search
CPC .............................. H04W 24/10; H04W 28/16
USPC ................... 455/423, 436, 452.2, 501, 452.1; 370/329, 331, 237, 252, 328
See application file for complete search history.

(56) References Cited

U.S. PATENT DOCUMENTS

2005/0094600 A1* 5/2005 Zhang et al. .................. 370/331
2011/0038330 A1* 2/2011 Luo et al. ...................... 370/329
(Continued)

OTHER PUBLICATIONS

3GPP TS36.331 v9.4.0 (Sep. 2010) 3GPP TSGRAN E-UTRA RRC Protocol specification (Release 9), Sep. 2010.
(Continued)

*Primary Examiner* — Nathan Taylor
(74) *Attorney, Agent, or Firm* — Pearne & Gordon LLP

(57) ABSTRACT

Provided is a terminal that achieves appropriate handover control even in a case where a cell group in which downstream communication is performed by coordination between a plurality of cells is included in a communication system. According to the terminal (100), a CoMP quality calculation unit (105) calculates a comprehensive quality value for a group to be quality calculated on the basis of a reference signal transmitted from the group to be quality calculated, and, when the comprehensive quality value calculated exceeds a CoMP threshold, a measurement control unit (106) transmits to the communicating cell the quality of the reference signal transmitted from at least one cell of the plurality of cells included in the group to be quality calculated.

11 Claims, 11 Drawing Sheets

(56) References Cited

U.S. PATENT DOCUMENTS

| | | | |
|---|---|---|---|
| 2011/0124345 A1* | 5/2011 | Lee et al. | 455/452.2 |
| 2011/0235608 A1* | 9/2011 | Koo et al. | 370/329 |
| 2011/0281585 A1* | 11/2011 | Kwon et al. | 455/436 |
| 2012/0020230 A1* | 1/2012 | Chen et al. | 370/252 |
| 2012/0028665 A1* | 2/2012 | Kwon et al. | 455/501 |
| 2012/0113951 A1* | 5/2012 | Koo et al. | 370/329 |
| 2012/0170679 A1* | 7/2012 | Koo et al. | 375/295 |
| 2013/0044602 A1* | 2/2013 | Xiao et al. | 370/237 |
| 2013/0196678 A1* | 8/2013 | Liu et al. | 455/452.1 |

OTHER PUBLICATIONS

3GPP TS36.214 v9.2.0 (Jun. 2010) Physical layer—Measurements (Release 9), Jun. 2010.

TR36.814 V2.0.0 (Mar. 2010) Further Advancements for E-UTRA—Physical Layer Aspects (Release 9), Mar. 2010.

CHTTL, Discussions on CoMP Cooperating Set, R1-092833, 3GPP, Jun. 29, 2009.

International Search Report for PCT/JP2012/000236 dated Apr. 17, 2012.

* cited by examiner

TERMINAL AND QUALITY TRANSMISSION METHOD

TECHNICAL FIELD

The claimed invention relates to a terminal and a quality transmission method.

BACKGROUND ART

In a mobile communication system, a situation may occur in which received power of a terminal communicating with a certain cell decreases due to movement of the terminal itself, change in the surrounding environment and/or the like, making it difficult to keep the communication. For such a situation, the terminal can maintain communication by reconnecting to a cell having higher received power than the cell in communication. The processing to switch between cells is referred to as "handover." In order to perform handover, the terminal needs to measure the received power of a signal transmitted from a cell around a "serving cell" and report the received power to the serving cell. The term "serving cell" as used herein refers to a cell which notifies a terminal in communication of control information. In LTE, this processing performed by a terminal to measure the received power and/or reception quality of signals transmitted from surrounding cells (also referred to as neighboring cells") is referred to as "measurement."

Non-Patent Literature (hereinafter, referred to as "NPL") 1 describes measurement and the operation of handover in LTE.

That is, a base station (serving cell) first configures a terminal in communication with respect to measurement. Specifically, the measurement configuration refers to setting of a measurement target (carrier frequency or the like), setting of a list of serving cell and neighboring cells (list of cell IDs), setting of measurement timing, and setting of details about report values. Setting of details about report values indicates setting of types of report values (Reference Signal Received Power (RSRP) and Reference Signal Received Quality (RSRQ) defined in NPL 2, and/or the like), setting of a trigger condition for prompting the base station to transmit report values, and setting of reporting periods. The terminal performs measurement using a reference signal (RS) generated using a cell-specific sequence, a synchronization signal, and a data signal transmitted from a serving cell and neighboring cells.

The terminal performs quality measurement of signals transmitted from the serving cell and neighboring cells on the basis of the setting by the base station. If a predetermined trigger condition set by the base station is satisfied, the terminal reports the measured value of quality to the base station (i.e., serving cell). A trigger condition is, for example, a condition that the quality level of the serving cell exceeds a predetermined threshold, or a condition that the quality of a neighboring cell exceeds the quality of the serving cell by a predetermined threshold or more.

The base station determines a handover destination cell based on the measured value of quality reported from the terminal and instructs the terminal to perform handover. Upon receiving the instruction from the base station, the terminal switches from the serving cell to another by disconnecting communication with the handover source cell and connecting to the handover destination cell.

In addition, studies have been carried out on CoMP (Coordinated multiple point transmission and reception), a communication system in which a plurality of cells transmits data to a terminal in a coordinated manner, mainly for the purpose of improving throughput for users at the cell edge in the downlink of LTE-Advanced, which is an evolved form of 3GPP LTE (3rd Generation Partnership Project Long-Term Evolution).

In LTE-Advanced, Dynamic Cell Selection (DCS) and Joint Transmission (JT) have been under study as a CoMP scheme. DCS is a system that dynamically selects a cell transmitting data according to the propagation state from among a plurality of cells involved in CoMP. In addition, JT is a system in which a plurality of cells involved in CoMP transmits the same signal simultaneously to terminals.

In order to improve the transmission characteristics by CoMP at a lower cost, studies have been carried out on forming a plurality of cells with Baseband Signal Processors (BSP) and Remote Radio Heads (RRH). FIG. 1 shows two cell groups (CoMP groups in the drawing) each including three RRHs and one BSP. Then, each cell corresponds to one of groups of pairs each formed of each RRH and one BSP.

A BSP is a processor which performs baseband signal processing such as generation of transmission signals to a terminal, demodulation of signals received from a terminal, and scheduling of a plurality of terminals. The BSP is connected to a plurality of RRHs with a cable (optical fiber) and communicates with terminals via the RRHs. Note that, the BSP may also be referred to as a Base Band Unit (BBU).

An RRH includes an amplifier and an antenna. On the downlink, the RRH receives as input a baseband signal generated in the BSP and transmits, to the terminal via an antenna, a signal obtained by performing transmission processing on the received baseband signal, such as D/A conversion, up-conversion, amplification, and/or the like. On the other hand, on the uplink, the RRH transmits, to the BSP, a baseband signal obtained by performing reception processing on the signal received from the terminal via the antenna, such as down-conversion, A/D conversion, and/or the like. Note that, an RRH, also referred to as a "remote base station," is recognized by a terminal as a cell.

As shown in FIG. 1, applying CoMP only between a plurality of RRHs (cells) connected to a single BSP has been under study in LTE-Advanced. In other words, no CoMP is applied between RRHs which are connected to different BSPs. This is because only a small performance advantage is expected by CoMP. In addition, performing CoMP of this type requires a new I/F to be defined between BSPs, which results in a further increased control delay. The configuration in which a single BSP and a plurality of RRHs connected to the BSP is referred to as a "CoMP group." Note that, a CoMP group may also be referred to as a CoMP cooperating set.

CITATION LIST

Non-Patent Literature

NPL 1
3GPP TS36.331 v9.4.0 (2010-09) 3GPP TSGRAN E-UTRA RRC Protocol specification (Release 9)
NPL 2
3GPP TS36.214 v9.2.0 (2010-06) Physical layer—Measurements (Release 9)
NPL 3
TR36.814 V2.0.0 (2010-03) Further Advancements for E-UTRA Physical Layer Aspects (Release 9)

SUMMARY OF INVENTION

Technical Problem

However, there has been no proposal as to handover control in a system in which a cell singly performing downlink communication with a single terminal coexists with a CoMP group in which a plurality of cells performs downlink communication with a single terminal in a coordinated manner.

It is an object of the claimed invention to provide a terminal and a quality transmission method which can achieve appropriate handover control even if a cell group in which a plurality of cells performs downlink communication in a coordinated manner is included in a communication system.

Solution to Problem

A terminal according to an aspect of the claimed invention includes: a receiving section that receives a reference signal transmitted from a quality calculation target group including all or part of a plurality of cells forming a cell group that transmits downlink data in a coordinated manner; a calculating section that calculates a comprehensive quality value for the quality calculation target group on the basis of the received reference signal; and a transmitting section that transmits, to a cell in communication, information on quality of the reference signal transmitted from at least one of a plurality of cells included in the quality calculation target group, when the calculated comprehensive quality value exceeds a first threshold.

A quality transmission method according to an aspect of the claimed invention includes: receiving a reference signal transmitted from a quality calculation target group including all or part of a plurality of cells forming a cell group that transmits downlink data in a coordinated manner; calculating a comprehensive quality value for the quality calculation target group on the basis of the received reference signal; and transmitting, to a cell in communication, information on quality of the reference signal transmitted from at least one of a plurality of cells included in the quality calculation target group, when the calculated comprehensive quality value exceeds a first threshold.

Advantageous Effects of Invention

According to the claimed invention, a terminal and a quality transmission method can be provided which can achieve appropriate handover control even if a cell group in which a plurality of cells performs downlink communication in a coordinated manner is included in a communication system.

DESCRIPTION OF EMBODIMENTS

The inventors of this application have found the following problem that occurs when the conventional handover control method is applied without any modification to a communication system including a cell group (i.e., CoMP group) in which a plurality of cells performs downlink communication in a coordinated manner.

Figure 1:
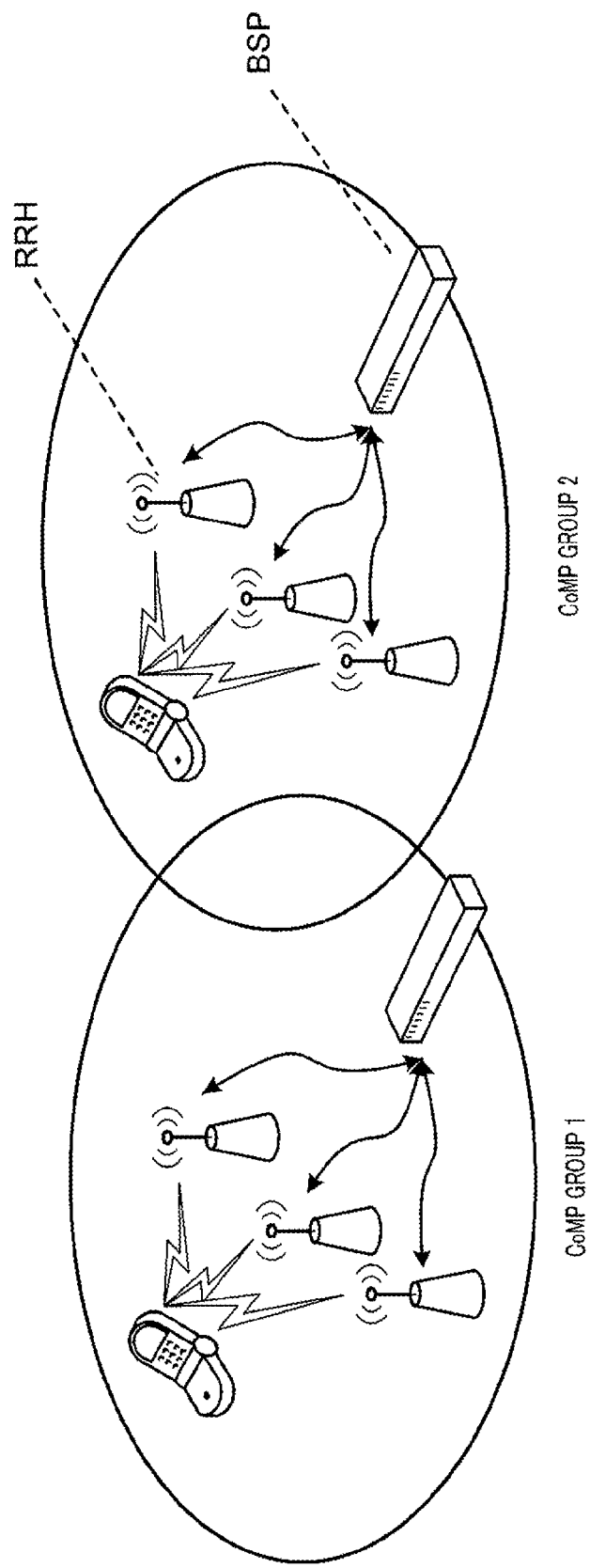
FIG. 1 is a diagram for explaining a CoMP group.
Figure 2:
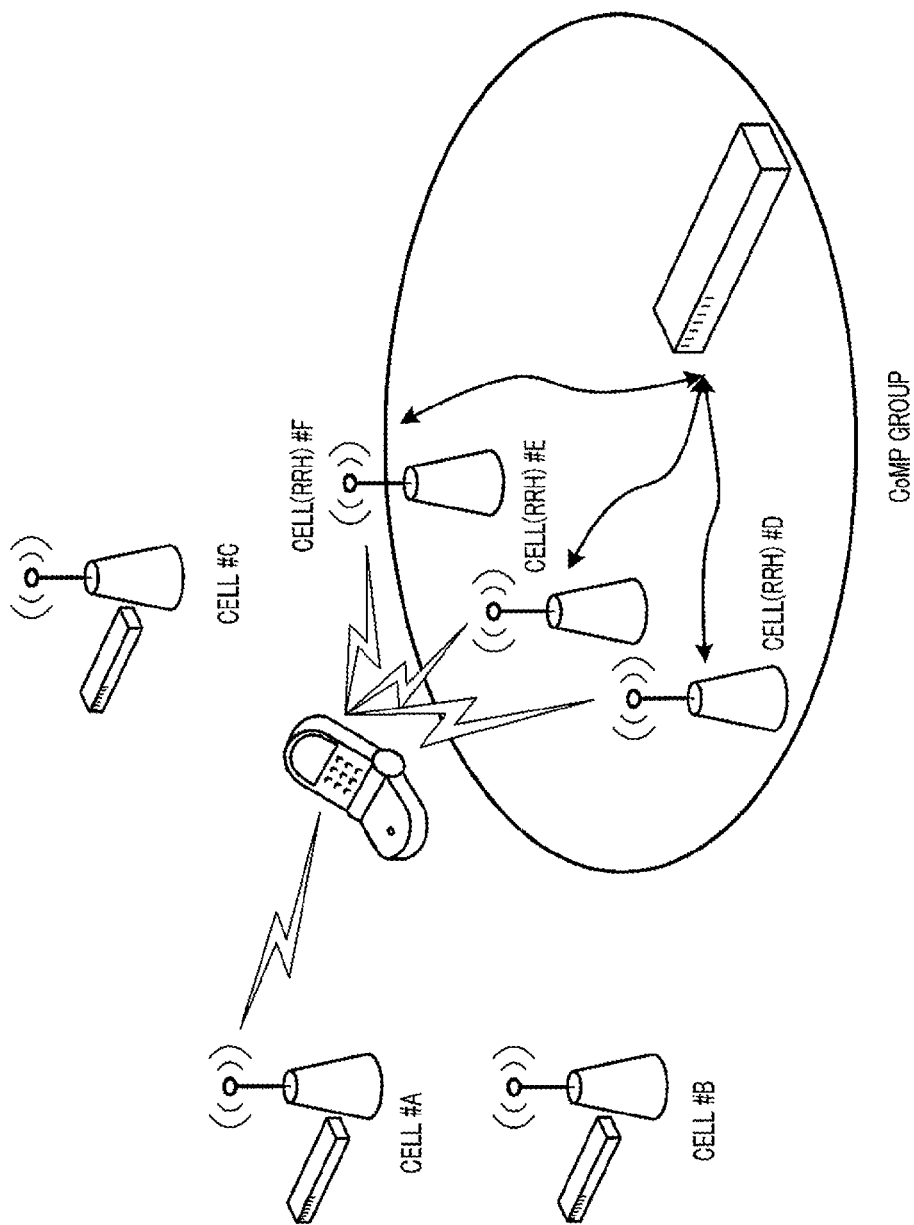
FIG. 2 shows a communication system including a CoMP group.

FIG. 2 shows a communication system including a CoMP group. In the communication system of FIG. 2, cells #D, E, F among cells #A to F are connected to a single BSP and thus form a CoMP group. Cells #A, B, C, on the other hand, are cells to which no CoMP is applied.

Figure 3:
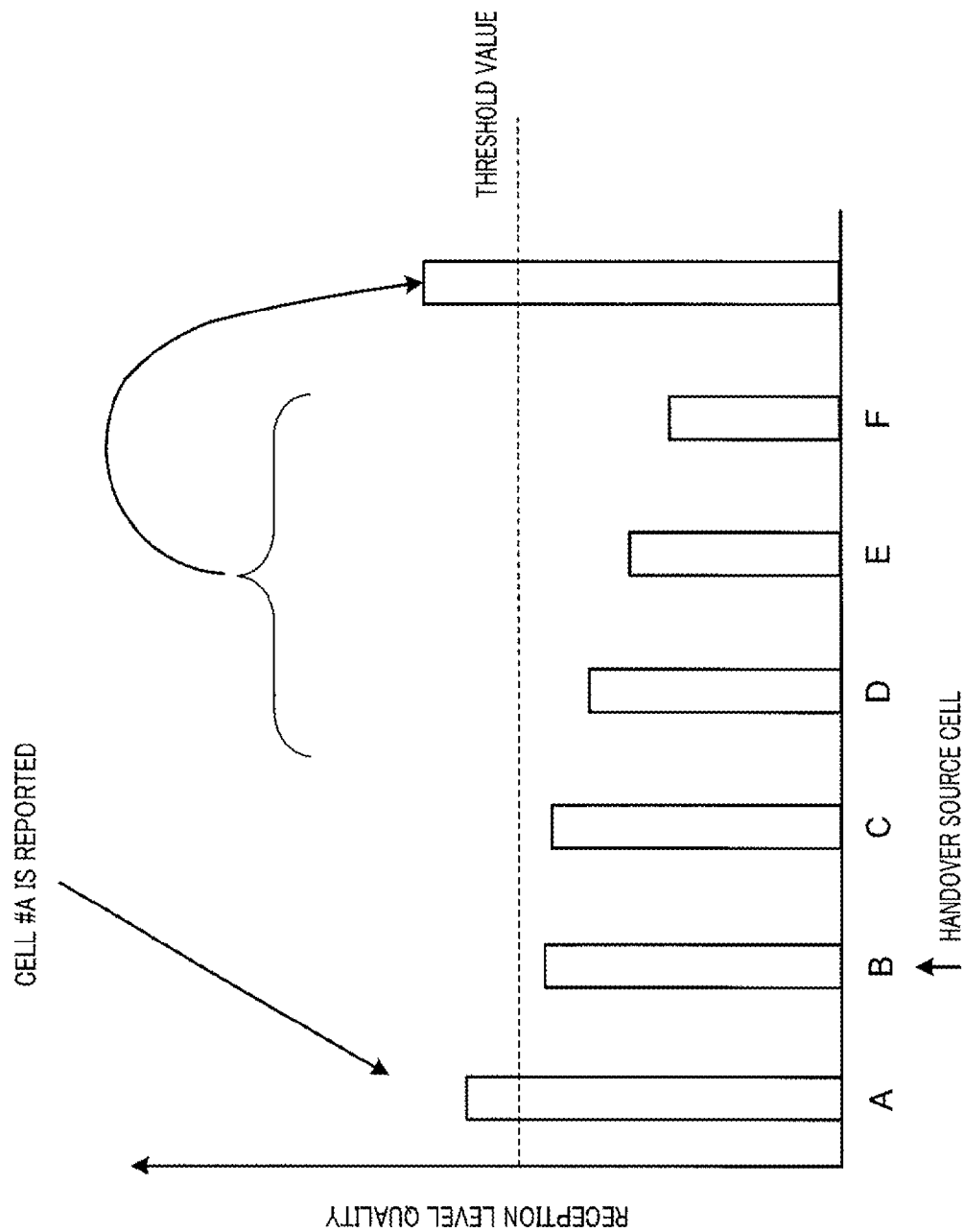
FIG. 3 is a graph showing an exemplary reception level of each cell in the communication system of FIG. 2.

FIG. 3 shows an example of each reception level (report value) of cells #A to F. In FIG. 3, the quality of cell #A which is the highest among the cells having qualities exceeding a threshold is reported to the base station. Accordingly, the terminal that has made the report is handed over to cell #A. However, handing over to any of CoMP-applicable cells #D, E, F may result in a much better quality than the quality of cell #A because of application of CoMP.

However, although the quality of CoMP-applicable cells #D, E, F is the highest considering CoMP application, the conventional measurement method does not report the quality information on cells #D, E, F to the base station. This is because the conventional measurement method compares the quality per cell with the threshold and reports only the quality of the cell with the highest quality among the cells having qualities exceeding the threshold. In other words, in the example shown in FIG. 3, CoMP-applicable cells #D, E, F are not the quality reporting target since their qualities do not exceed the threshold and they are not considered as having the highest quality either.

Figure 4:
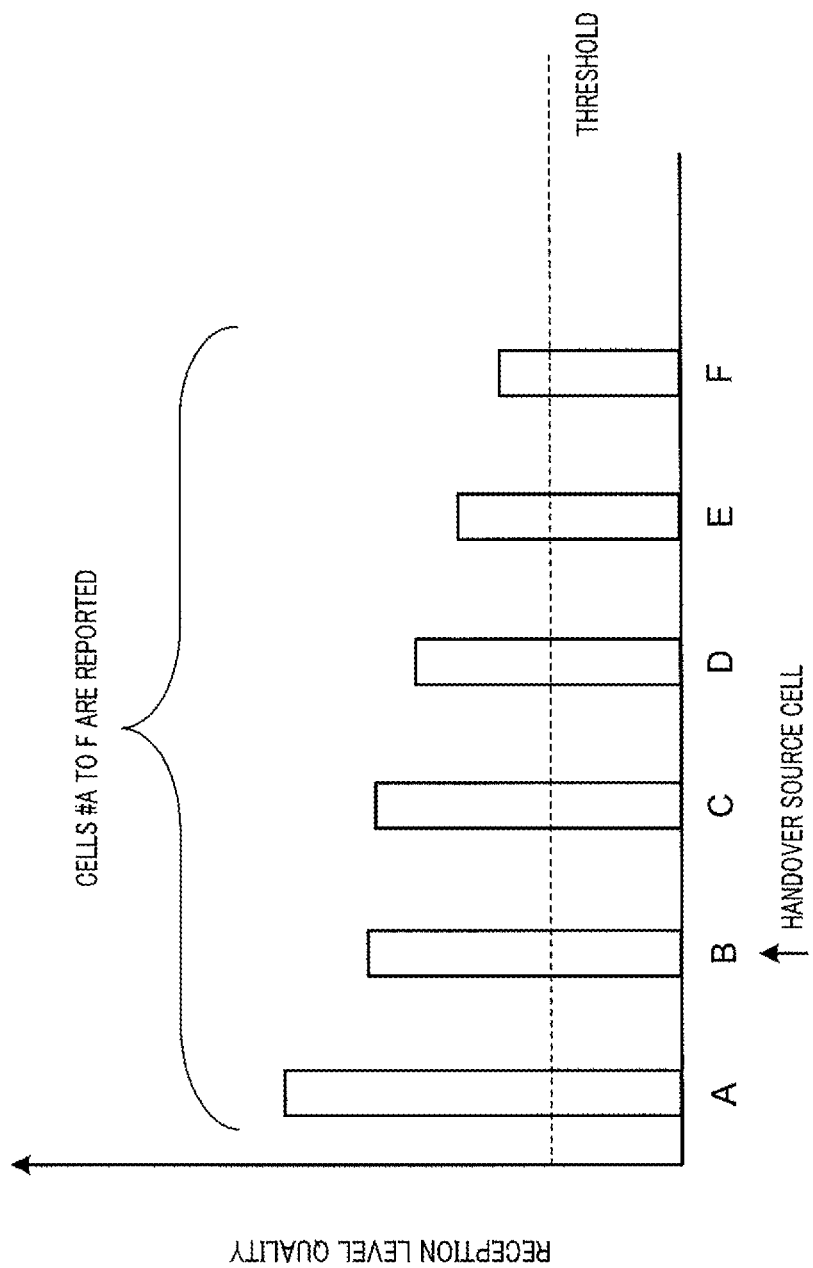
FIG. 4 is a graph for explaining a problem with a quality report from a terminal.

As a solution to avoid such an inconvenience, simply lowering the threshold which is the trigger condition for report may be possible as shown in FIG. 4. In this case, the terminal can report all the qualities of cells #A to F to the base station, and the base station can estimate the effect of performance improvement by CoMP as a result. However, there is a problem with the method, in that the overhead of the system increases due to frequent occurrence of reports as well as an increase in the number of cells to be reported.

In view of the above described problem, the inventors of this application have reached the claimed invention.

In the following, embodiments of the claimed invention will be described in detail with reference to the drawings. Note that, in the embodiments, the same components are assigned the same reference numerals while the explanation thereof is omitted to avoid duplication.

(Embodiment 1)
(Main Configuration of Terminal)

Figure 5:
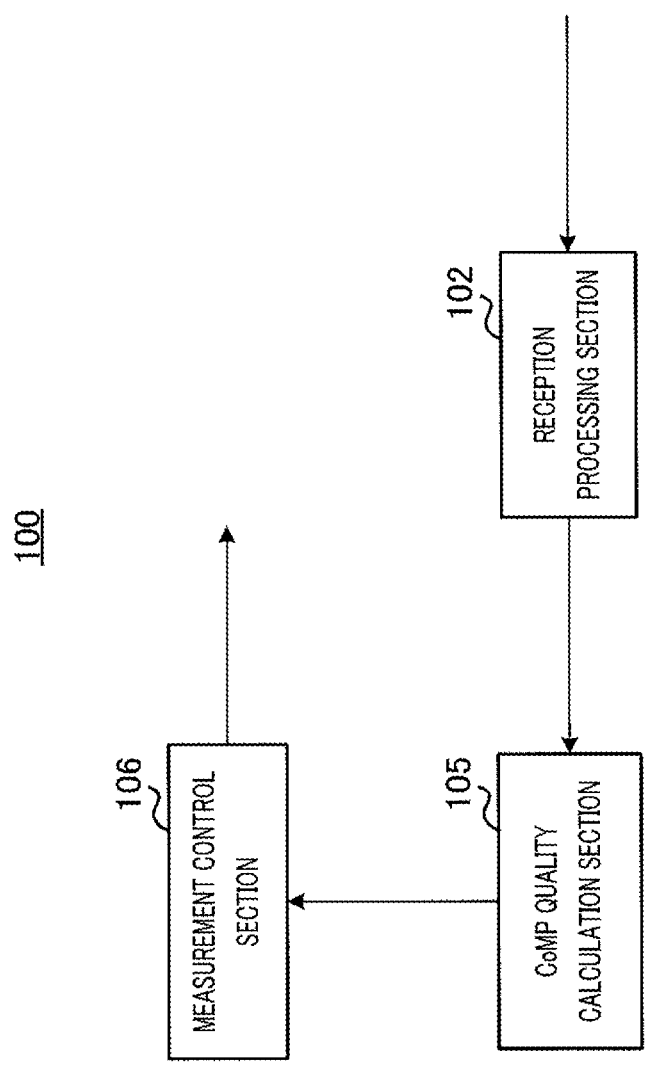
FIG. 5 is a main configuration diagram of a terminal according to Embodiment 1 of the claimed invention.

FIG. 5 is a main configuration diagram of a terminal according to Embodiment 1 of the claimed invention. In terminal 100 of FIG. 5, reception processing section 102 receives reference signals transmitted from a quality calculation target group including all of cells forming a cell group that transmits downlink data in a coordinated manner and outputs the received reference signals to CoMP quality calculation section 105. CoMP quality calculation section 105 calculates a comprehensive quality value for the quality calculation target group based on the received reference signals and outputs the calculated comprehensive quality value to measurement control section 106. If the calculated comprehensive quality value exceeds a threshold, measurement control section 106 transmits, to a serving cell, information on the quality of a reference signal transmitted from at least one of the plurality of cells included in the quality calculation target group.

(Configuration of Terminal)

Figure 6:
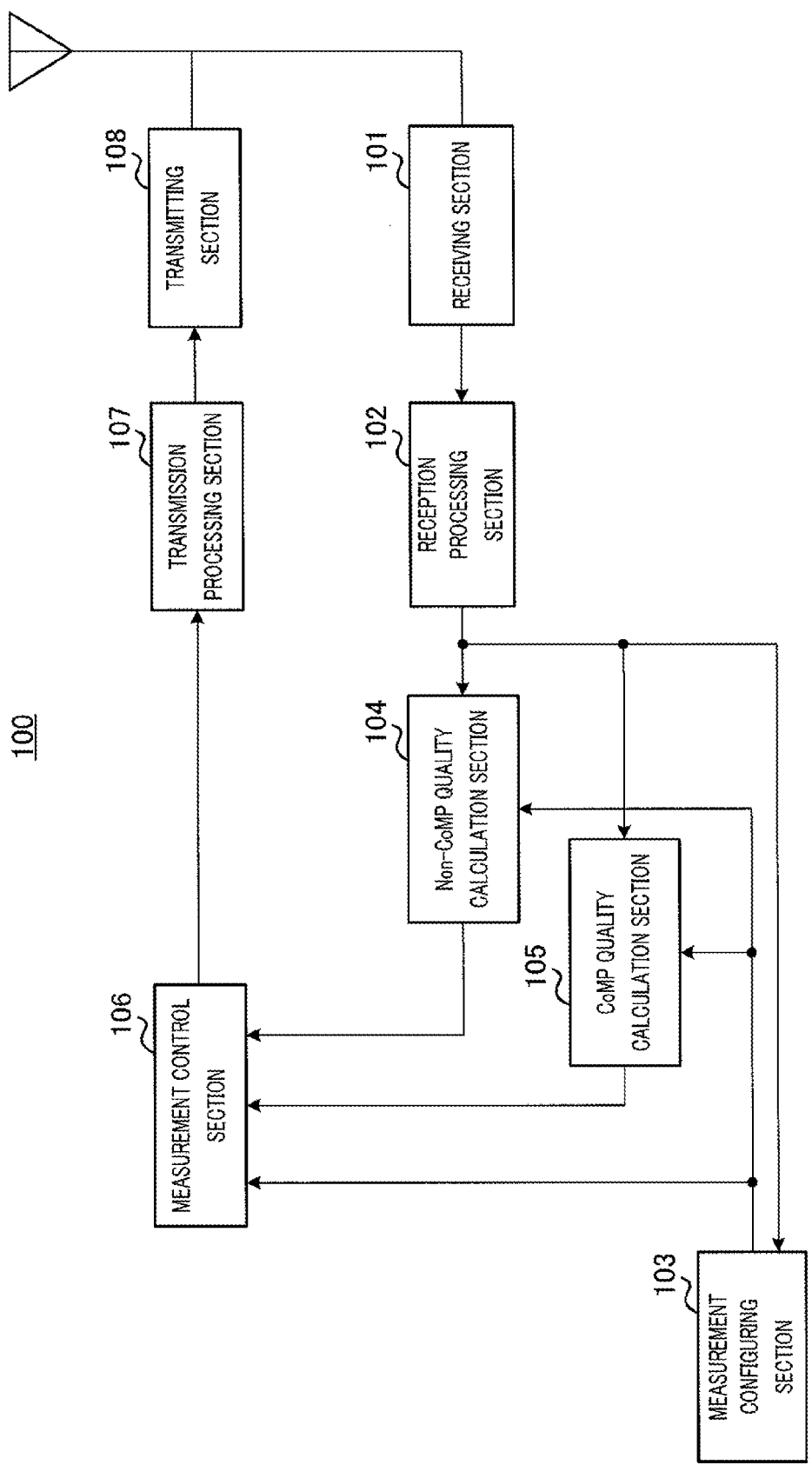
FIG. 6 is a block diagram showing a configuration of the terminal according to Embodiment 1 of the claimed invention.

FIG. 6 is a block diagram showing a configuration of the terminal according to Embodiment 1 of the claimed invention. In FIG. 6, terminal 100 includes receiving section 101, reception processing section 102, measurement configuring section 103, Non-CoMP quality calculation section 104, CoMP quality calculation section 105, measurement control section 106, transmission processing section 107, and transmitting section 108.

Receiving section 101 receives, via an antenna, a signal transmitted from base station 200 described below, and performs radio reception processing (down-conversion, A/D conversion and/or the like) on the received signal. The received signal thus obtained after the radio reception processing is outputted to reception processing section 102.

Reception processing section 102 performs reception processing (demodulation, decoding, and/or the like) on a signal received from receiving section 101, and extracts, from the signal after reception processing, a signal used for measurement (i.e., reference signal, data signal, or the like transmitted by each cell). The extracted signal is outputted to measurement configuring section 103, Non-CoMP quality calculation section 104, and CoMP quality calculation section 105.

Measurement configuring section 103 extracts, from the signal received from reception processing section 102, control information transmitted from base station 200 corresponding to the serving cell, and outputs the control information to Non-CoMP quality calculation section 104, CoMP quality calculation section 105, and measurement control section 106.

The control information transmitted from base station 200 corresponding to the serving cell includes, in addition to the information conventionally used for measurement, identification information of cells which are the target of CoMP quality estimation among a plurality of cells included in the CoMP group (i.e., CoMP quality calculation target group) and the CoMP threshold. Incidentally, the information used for the measurement described above is information on a measurement target (carrier frequency or the like), a list of a serving cell and neighboring cells (list of cell IDs), measurement timing, details related to report values (type of report value, trigger condition for transmitting report values, an ID associated with trigger condition, and/or the like).

The CoMP quality calculation target group coincides with the CoMP group in this embodiment. CoMP quality calculation target group identification information (or CoMP group identification information) includes a plurality of cell IDs corresponding to a plurality of cells belonging to that group. In addition, the CoMP quality calculation target group identification information (or CoMP group identification information) may be notified to terminal 100 from base station 200 corresponding to the serving cell by RRC signaling. Furthermore, the CoMP quality calculation target group identification information may be included in the cell ID and notified to terminal 100 from base station 200 corresponding to the serving cell, or may be included in broadcast information and notified to terminal 100 from base station 200 corresponding to the serving cell.

In addition, a value different from the conventional threshold (i.e., Non-CoMP threshold) for the measured quality of each cell is independently set as the CoMP threshold.

Non-CoMP quality calculation section 104 measures the qualities of the serving cell and neighboring cells (e.g., RSRP or RSRQ) on a per cell basis based on the control information received from measurement configuring section 103. For the quality measurement, the reference signal or data signal transmitted from each of the serving cell and neighboring cells is used. Then, the measured quality values respectively for the serving cell and neighboring cells are outputted to measurement control section 106. The measured quality values may be referred to as "Non-CoMP quality."

CoMP quality calculation section 105 calculates the quality (e.g., RSRP or RSRQ) on a per CoMP quality calculation target group, taking into consideration the quality improvement effect by CoMP, based on the control information received from measurement configuring section 103. In other words, CoMP quality calculation section 105 measures the quality (e.g., RSRP or RSRQ) of each of a plurality of cells forming a group indicated by the CoMP quality calculation target group identification information included in the control information received from measurement configuring section 103. CoMP quality calculation section 105 then calculates the "comprehensive quality" (i.e., CoMP quality) for the CoMP quality calculation target group, based on a plurality of quality results measured for the plurality of cells.

Specifically, CoMP quality calculation section 105 combines the reference signals received from the respective cells forming the group indicated by the CoMP quality calculation target group identification information and calculates the "comprehensive quality" based on the combined signal. In more detail, CoMP quality calculation section 105 calculates the frequency response in each cell by performing a correlation operation between the reference signal received from each of the plurality of cells forming the group indicated by the CoMP quality calculation target group identification information and a preliminarily stored replica signal (the same signal as the reference signal transmitted from each cell). CoMP quality calculation section 105 can calculate an optimal transmission weight of each cell based on the frequency response. Therefore, CoMP quality calculation section 105 can calculate the "comprehensive quality" based on the combined signal to which the calculated optimal transmission weights are applied.

The calculated comprehensive quality value is outputted to measurement control section 106.

Measurement control section 106 configures the CoMP threshold based on the control information received from measurement configuring section 103, and transmits the Non-CoMP quality of at least one of the plurality of cells in the CoMP quality calculation target group when the comprehensive quality value received from CoMP quality calculation section 105 exceeds the CoMP threshold. Specifically, measurement control section 106 selects at least one of the cells included in the CoMP quality calculation target group, when the comprehensive quality value received from CoMP quality calculation section 105 exceeds the CoMP threshold. Measurement control section 106 then generates report information including the cell ID and Non-CoMP quality of the selected cell and information explicitly indicating that the report is issued because the comprehensive quality value exceeds the threshold (e.g., ID associated with a plurality of trigger conditions preliminarily notified from base station 200). The report information is transmitted via transmission processing section 107, transmitting section 108, and an antenna.

Transmission processing section 107 performs transmission processing (multiplexing of reference signals, encoding, modulation and/or the like) on the report information generated in measurement control section 106, and outputs the signal after transmission processing to transmitting section 108.

Transmitting section 108 performs radio transmission processing (frequency conversion to radio frequency, power amplification, transmission filter processing, and/or the like) on a transmission signal received from transmission processing section 107, and transmits the signal after the radio transmission processing via an antenna.

(Configuration of Base Station)

Figure 7:
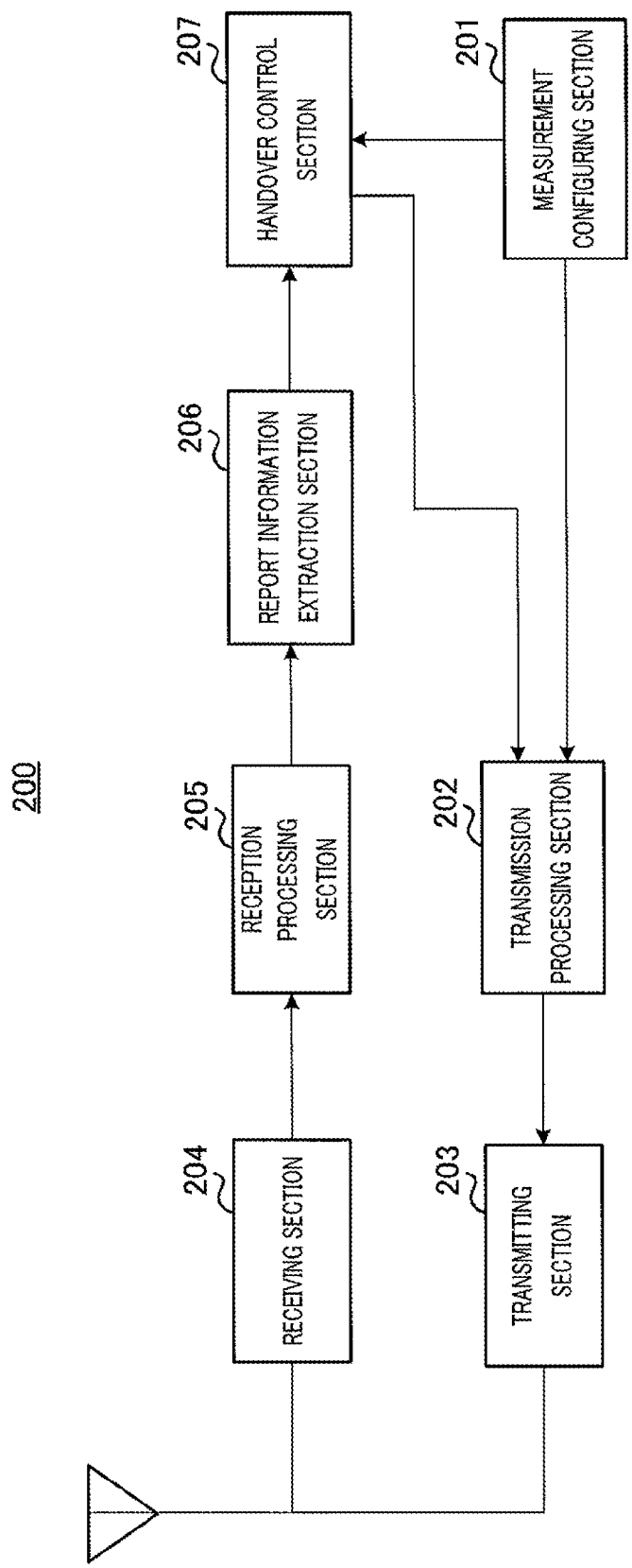
FIG. 7 is a block diagram showing a configuration of a base station according to Embodiment 1 of the claimed invention.

FIG. 7 is a block diagram showing a configuration of the base station according to Embodiment 1 of the claimed invention. In FIG. 7, base station 200 includes measurement configuring section 201, transmission processing section 202, transmitting section 203, receiving section 204, reception processing section 205, report information extraction section 206, and handover control section 207. Base station 200, corresponding to a serving cell, is a base station belonging to a CoMP group or a base station not belonging to any CoMP group (i.e., a base station which transmits downlink data independently). In the case of a base station belonging to a CoMP group, transmitting section 203 and receiving section 204 belong to an RRH whereas transmission processing section 202, reception processing section 205, report information extraction section 206, and handover control section 207 belong to the BSP among the components of base station 200.

Measurement configuring section 201 generates control information required for measurement in terminal 100. As has been described above, the control information includes, in addition to the information conventionally used for measurement, identification information and a CoMP threshold of cells which are targets of CoMP quality estimation (i.e., CoMP quality calculation target group) among a plurality of cells included in the CoMP group. The information used for the above-mentioned measurement is information on a measurement target (carrier frequency or the like), a list of a serving cell and neighboring cells (list of cell IDs), measurement timing, details related to report values (type of report value, trigger condition for transmitting report values, ID associated with trigger condition, or the like).

Measurement configuring section 201 then outputs the generated control information to handover control section 207, and also transmits it to transmission processing section 202, transmitting section 203, and to terminal 100 via the antenna.

Transmission processing section 202 performs transmission processing (multiplexing of reference signals, encoding, modulation and/or the like) on the control information generated in measurement configuring section 201 and the handover instruction information generated in handover control section 207, and outputs the signal after transmission processing to transmitting section 203.

Transmitting section 203 performs radio transmission processing (frequency conversion to radio frequency, power amplification, transmission filter processing, and/or the like) on a transmission signal received from transmission processing section 202, and transmits the signal after the radio transmission processing via the antenna.

Receiving section 204 receives, via the antenna, a signal transmitted from terminal 100, and performs radio reception processing (down-conversion, A/D conversion and/or the like) on the received signal. The received signal thus obtained after the radio reception processing is outputted to reception processing section 205.

Reception processing section 205 performs reception processing (demodulation, decoding, and/or the like) on a signal received from receiving section 204, and the reception-processed signal is outputted to report information extraction section 206.

Report information extraction section 206 extracts, from the signal received from reception processing section 205, report information transmitted from terminal 100, and outputs the extracted report information to handover control section 207. The report information includes, as has been described above, the cell ID and Non-CoMP quality of the selected cell and information explicitly indicating that the report is issued because the comprehensive quality value exceeds the threshold (e.g., ID associated with a plurality of trigger conditions preliminarily notified from base station 200).

Hand over control section 207 performs handover control for terminal 100 based on the report information received from report information extraction section 206. Specifically, handover control section 207 determines, on the basis of the report information received from report information extraction section 206 and the control information received from measurement configuring section 201, whether or not to handover terminal 100 and, in the case of performing handover, to which cell terminal 100 is to be handed over (i.e., handover destination cell). During the determination, report information from terminal 100 (type of trigger condition, quality value included in the report information (including CoMP quality and Non-CoMP quality), cell identification information corresponding to the quality value) and traffic condition of each cell and the like are taken into account. It is necessary to consider not only CoMP quality but also Non-CoMP quality during the above-mentioned determination. This is because the control signal to which no CoMP is applied is transmitted from only a single cell (serving cell).

When determining to handover terminal 100, handover control section 207 then transmits handover instruction information to terminal 100 via transmission processing section 202, transmitting section 203, and the antenna.

(Operation of Terminal 100 and Base station 200)

Figure 8:
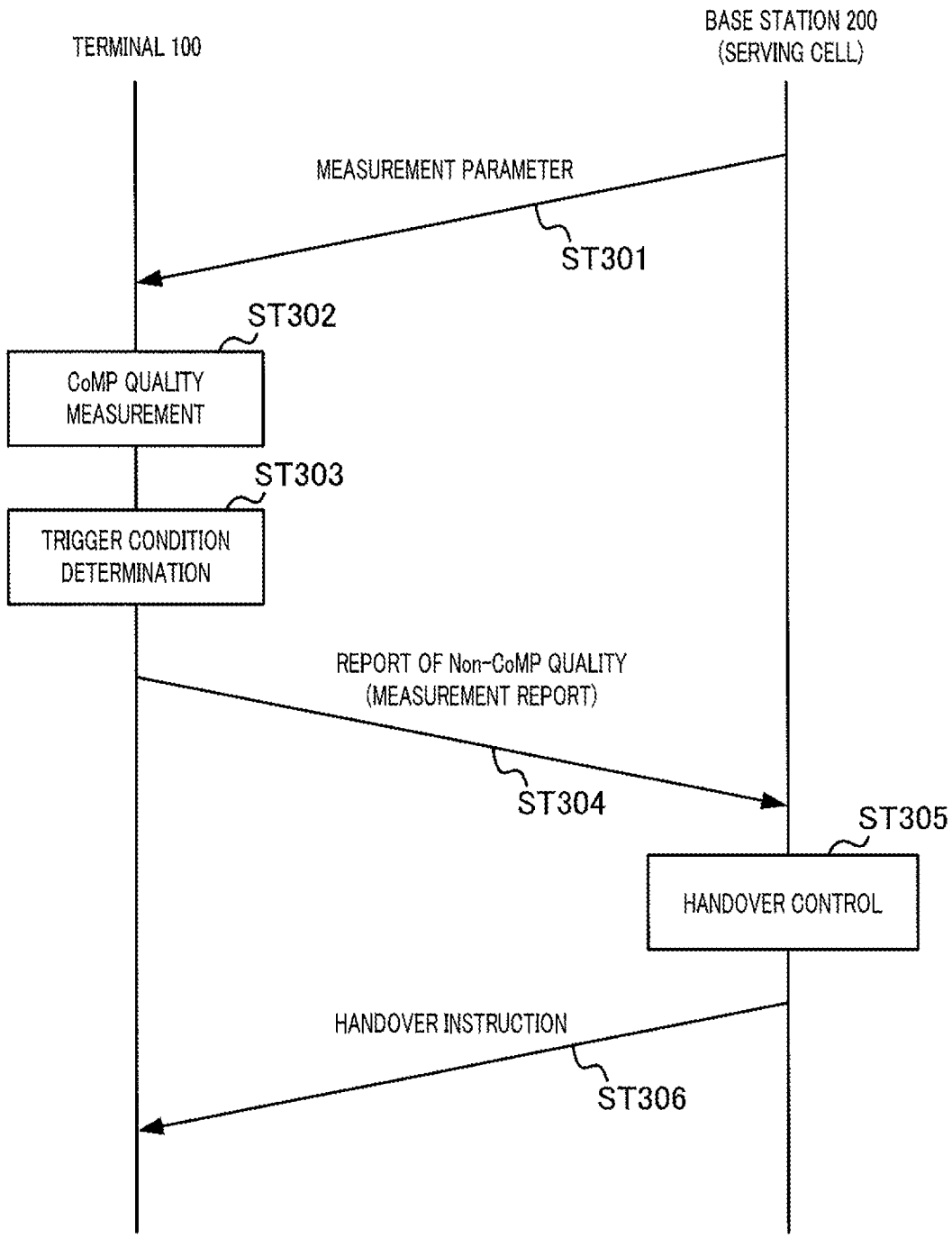
FIG. 8 is a diagram for explaining an operation of the terminal and the base station.

The operation of terminal 100 and base station 200 having the respective configurations described above will be described. FIG. 8 is a diagram for explaining the operation of terminal 100 and base station 200.

At step ST301, measurement configuring section 201 of base station 200 transmits control information required for measurement in terminal 100 (i.e., measurement parameter) to terminal 100.

At step ST302, CoMP quality calculation section 105 of terminal 100 measures the quality (e.g., RSRP or RSRQ) of each of a plurality of cells forming the group indicated by the CoMP quality calculation target group identification information, based on the control information transmitted from base station 200. CoMP quality calculation section 105 then calculates the "comprehensive quality" (i.e., CoMP quality) for the CoMP quality calculation target group based on the measured quality results of the cells. In this processing, Non-CoMP quality calculation section 104 measures the quality of the serving cell and neighboring cells on a per cell basis, based on the control information transmitted from base station 200.

At step ST303, measurement control section 106 of terminal 100 determines whether or not the comprehensive quality value received from CoMP quality calculation section 105 exceeds the CoMP threshold (i.e., whether or not the trigger condition is satisfied).

If the comprehensive quality value received from CoMP quality calculation section 105 exceeds the CoMP threshold, measurement control section 106 then transmits, at step ST304, the Non-CoMP quality of at least one of a plurality of cells included in the CoMP quality calculation target group. The Non-CoMP quality is included in the report information and transmitted.

At step ST305, handover control section 207 of base station 200 performs handover control for terminal 100 based on the report information transmitted from terminal 100. Specifically, handover control section 207 determines, on the basis of the report information received from report information extraction section 206 and the control information received from measurement configuring section 201, whether or not to handover terminal 100 and, in the case of performing handover, to which cell terminal 10 is to be handed over (i.e., handover destination cell).

If it has been determined to handover terminal 100, handover control section 207 transmits handover instruction information to terminal 100 at step ST306.

Figure 9:
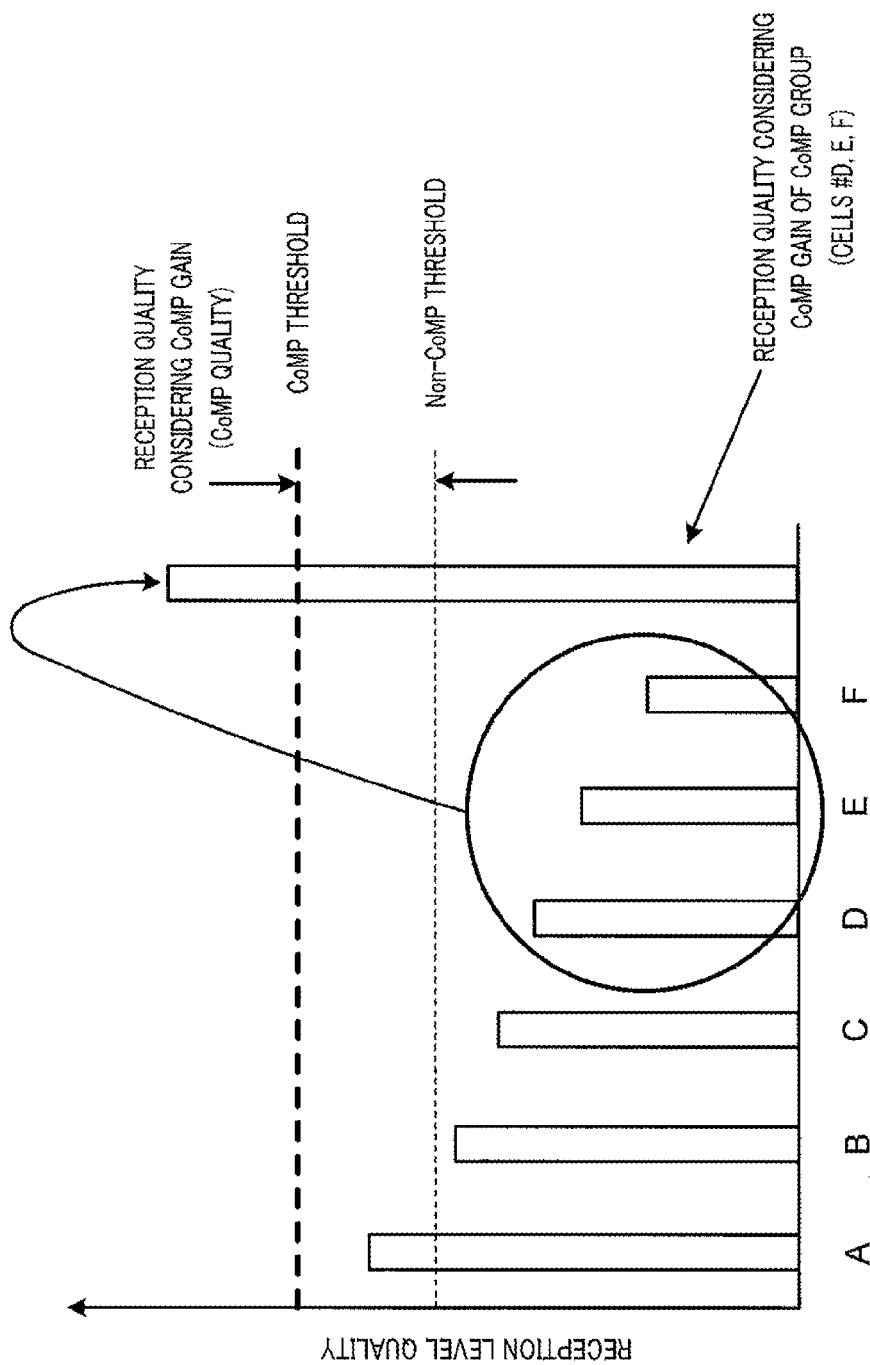
FIG. 9 is a graph for explaining CoMP threshold setting, quality calculation, trigger condition determination, and quality report by the terminal.

FIG. 9 is a graph for explaining CoMP threshold setting, quality calculation, trigger condition determination, and quality report by terminal 100. In FIG. 9, cells #A to C are cells to which no CoMP is applied, and cells #D to F are cells belonging to the same CoMP quality calculation target group.

<CoMP Threshold Setting>

Measurement configuring section 103 extracts, from the signal received from reception processing section 102, control information transmitted from base station 200 corresponding to the serving cell, and outputs the control information to Non-CoMP quality calculation section 104, CoMP quality calculation section 105, and measurement control section 106.

The control information transmitted from base station 200 corresponding to the serving cell includes, in addition to the information conventionally used for measurement, identification information and a CoMP threshold of cells which are targets of CoMP quality estimation (i.e., CoMP quality calculation target group) among a plurality of cells included in the CoMP group. Note that, the information used for the above-mentioned measurement is information on a measurement target (carrier frequency or the like), a list of a serving cell and neighboring cells (list of cell JDs), measurement timing, details related to report values (type of report value, trigger condition for transmitting report values, ID associated with trigger condition, and/or the like).

Then, a value different from the conventional threshold, (i.e., Non-CoMP threshold) for the measured quality of each cell is independently set as the CoMP threshold. The Non-CoMP threshold is a threshold to be compared with reception quality for a single cell. The CoMP threshold is larger than the Non-CoMP threshold (see FIG. 9).

<Quality Calculation>

Non-CoMP quality calculation section 104 measures the quality (e.g., RSRP or RSRQ) of the serving cell and neighboring cells on a per cell basis, based on the control information received from measurement configuring section 103.

In addition, CoMP quality calculation section 105 measures the quality (e.g., RSRP or RSRQ) of each of a plurality of cells forming the group indicated by the CoMP quality calculation target group identification information included in the control information received from measurement configuring section 103. CoMP quality calculation section 105 then calculates the "comprehensive quality" (i.e., CoMP quality) for the CoMP quality calculation target group based on the plurality of quality results measured for the cells. The CoMP quality calculation target group coincides with the CoMP group in this case.

Specifically, CoMP quality calculation section 105 combines the reference signals received from the plurality of cells forming the group indicated by the CoMP quality calculation target group identification information, and calculates the "comprehensive quality" based on the combined signal. In more detail, CoMP quality calculation section 105 calculates the frequency response in each cell by performing a correlation operation between the reference signal received from each of the plurality of cells forming the group indicated by the CoMP quality calculation target group identification information and a preliminarily stored replica signal (the same signal as the reference signal transmitted from each cell). CoMP quality calculation section 105 can calculate an optimal transmission weight of each cell based on the frequency response. Therefore, CoMP quality calculation section 105 can calculate the "comprehensive quality" based on the combined signal to which the calculated optimal transmission weight is applied. In FIG. 9, the "comprehensive quality" for cells #D to F is calculated.

<Trigger Condition Determination>

Measurement control section 106 sets the CoMP threshold based on the control information received from measurement configuring section 103 as described above, and determines whether or not the comprehensive quality value received from CoMP quality calculation section 105 exceeds the CoMP threshold. In other words, the trigger condition for transmitting the Non-CoMP quality of a plurality of cells included in the CoMP quality calculation target group is that the comprehensive quality value received from CoMP quality calculation section 105 exceeds the CoMP threshold. In FIG. 9, the CoMP quality for cells #D to F exceeds the CoMP threshold and therefore the trigger condition is satisfied. In addition, since the quality of cell #A also exceeds the Non-CoMP threshold, the trigger condition is satisfied for transmitting Non-CoMP quality for the cell to which Non-CoMP is not applied.

Comparison of CoMP quality and Non-CoMP quality shows that the value of CoMP quality is larger than the value of Non-CoMP quality. Therefore, separately setting the CoMP threshold other than the Non-CoMP threshold allows the Non-CoMP quality of the CoMP quality calculation target group to be transmitted only when a large transmission characteristic improvement effect is expected by using CoMP.

<Quality Report>

If the trigger condition is satisfied (i.e., when the comprehensive quality value received from CoMP quality calculation section 105 exceeds the CoMP threshold), measurement control section 106 transmits the Non-CoMP quality of at least one of a plurality of cells included in the CoMP quality calculation target group. In the situation shown in FIG. 9, first of all, the quality of cell #A exceeds the Non-CoMP threshold and therefore the quality is reported from terminal 100 to base station 200. Furthermore, the CoMP quality for cells #D to F also exceeds the CoMP threshold and therefore the Non-CoMP quality of at least one of the cells #D to F is also reported from terminal 100 to base station 200.

All of the plurality of cells included in the CoMP quality calculation target group may be target cells of Non-CoMP quality transmission. Accordingly, base station 200 can select a handover destination cell from among the plurality of cells included in the CoMP quality calculation target group, taking the traffic conditions into account.

In addition, part of a plurality of cells included in the CoMP quality calculation target group may be target cells of Non- CoMP quality transmission. For example, only the cell having the highest Non-CoMP quality among a plurality of cells included in the CoMP quality calculation target group may be the target cell of Non-CoMP quality transmission. Accordingly, base station 200 can handover terminal 100 to the cell having the best quality in the CoMP group.

In addition, measurement control section 106 may transmit the CoMP quality of the CoMP quality calculation target group besides the Non-CoMP quality thereof. Accordingly, base station 200 can recognize not only that the CoMP quality exceeds the threshold but also the absolute value of the quality.

According to the embodiment as described above, CoMP quality calculation section 105 in terminal 100 calculates the comprehensive quality value of the quality calculation target group based on the reference signals transmitted from the quality calculation target group. When the calculated comprehensive quality value exceeds the CoMP threshold, measurement control section 106 transmits the quality of the reference signal transmitted from at least one of a plurality of cells included in the quality calculation target group to the serving cell in communication (i.e., base station 200).

In this manner, it is possible to handover terminal 100 to a cell in which performance improvement by CoMP can be expected, while preventing frequent occurrence of quality reports, thus enabling improvement in the system performance. In other words, appropriate handover control can be realized even if a cell group in which a plurality of cells performs downlink communication in a coordinated manner is included in a communication system.

CoMP quality calculation section 105 calculates the comprehensive quality value based on the combined signal obtained by combining a group of received reference signals corresponding to the quality calculation target group using the calculated optimal transmission weights.

Note that, base station 200 cannot calculate the comprehensive quality value of the quality calculation target group. This is because, in LTE-Advanced, terminal 100 reports no frequency response (complex number), which has a large amount of information, but does report information equivalent to a power level or SINR (RSRP, RSRQ or the like), which has a small amount of information, instead, from the viewpoint of reducing the amount of notification. Therefore, since base station 200 cannot calculate the optimal transmission weight (complex number) of each cell obtainable from a frequency response, base station 200 cannot accurately calculate the comprehensive quality value of the quality calculation target group.

(Embodiment 2)

In Embodiment 1, the trigger condition for transmitting the Non-CoMP quality of a CoMP quality calculation target group is that the comprehensive quality value for the CoMP quality calculation target group exceeds the CoMP threshold. On the contrary, in Embodiment 2, the trigger condition for transmitting the Non-CoMP quality of a CoMP quality calculation target group is that at least one value in a group of added values each obtained by adding an offset value to the Non-CoMP quality of a corresponding one of the plurality of cells included in the CoMP quality calculation target group exceeds the Non-CoMP threshold. Since the base station and the terminal according to Embodiment 2 are similar to terminal 100 and base station 200 according to Embodiment 1, a description will be provided referring to FIGS. 6 and 7.

In terminal 100 of Embodiment 2, measurement configuring section 103 extracts, from a signal received from reception processing section 102, control information transmitted from base station 200 corresponding to the serving cell, and outputs the control information to Non-CoMP quality calculation section 104, CoMP quality calculation section 105, and measurement control section 106.

In Embodiment 2, the same value as the conventional threshold for the measured quality of each cell (i.e., the Non-CoMP threshold) is set as the CoMP threshold. In other words, only the Non-CoMP threshold may be set in Embodiment 2.

CoMP quality calculation section 105 calculates, for each of the cells forming the CoMP quality calculation target group, the quality (e.g., RSRP or RSRQ) taking into consideration the quality improvement effect by CoMP, on the basis of control information received from measurement configuring section 103. CoMP quality calculation section 105 measures the quality (e.g., RSRP or RSRQ) of each of the plurality of cells forming the group indicated by the CoMP quality calculation target group identification information included in the control information received from measurement configuring section 103. CoMP quality calculation section 105 then calculates the "comprehensive quality" (i.e., CoMP quality) for the CoMP quality calculation target group, based on the quality results measured for the cells.

Specifically, CoMP quality calculation section 105 measures the quality (e.g., RSRP or RSRQ) of each of the plurality of cells forming the group indicated by the CoMP quality calculation target group identification information included in the control information received from measurement configuring section 103. Then, CoMP quality calculation section 105 calculates the "comprehensive quality" by adding an offset value to each of the quality results measured for the cells. Here, the offset value is set on a per CoMP quality calculation target group basis.

If the comprehensive quality value received from CoMP quality calculation section 105 exceeds the CoMP threshold, measurement control section 106 transmits the Non-CoMP quality of at least one of the plurality of cells included in the CoMP quality calculation target group. Specifically, if at least one value in the group of added values each obtained by adding an offset value to the Non-CoMP quality of a corresponding one of the plurality of cells included in the CoMP quality calculation target group exceeds the Non-CoMP threshold, measurement control section 106 transmits the Non-CoMP quality of at least one of the plurality of cells included in the CoMP quality calculation target group.

In base station 200 of Embodiment 2, measurement configuring section 201 determines the offset value described above. The offset value is included in the control information and transmitted to terminal 100 via transmission processing section 202, transmitting section 203, and the antenna.

Figure 10:
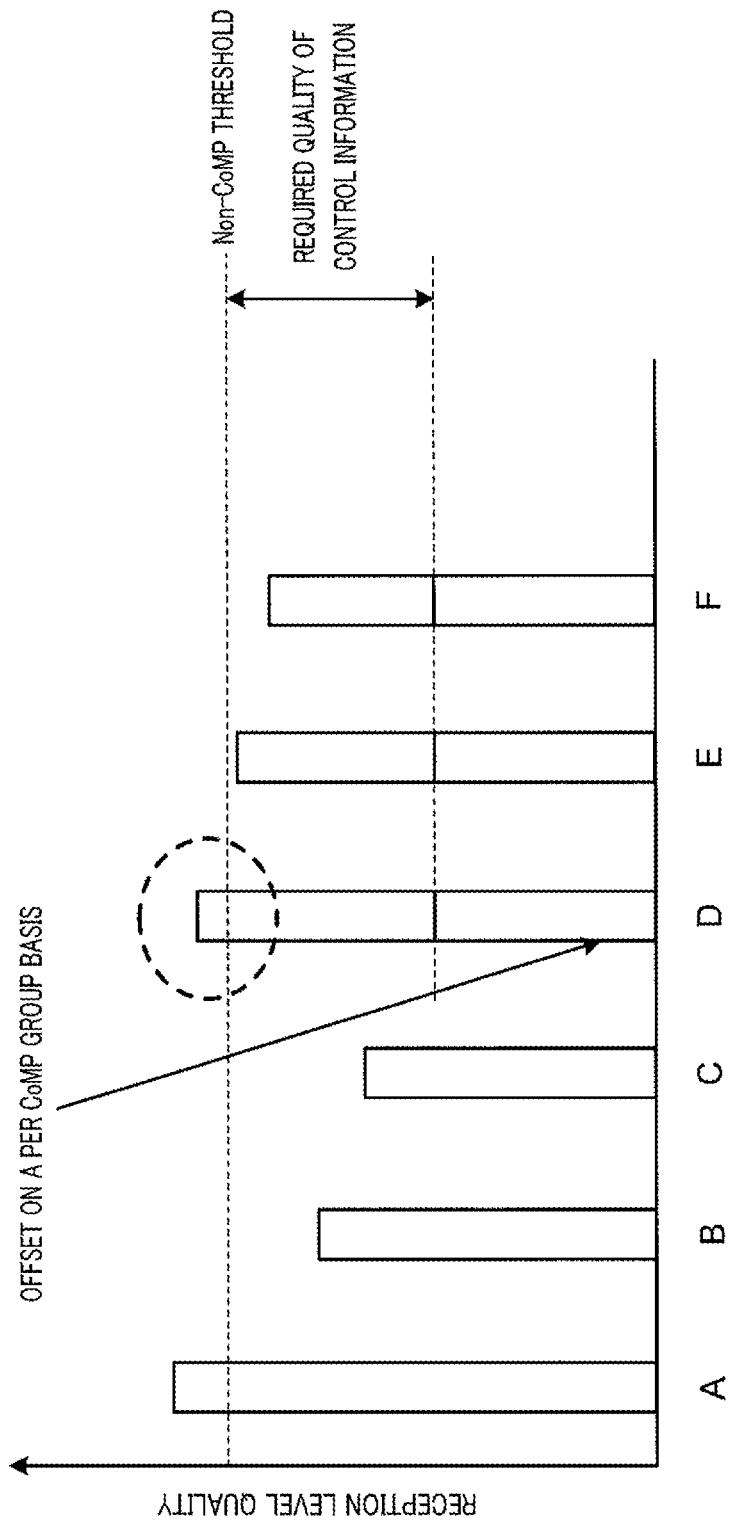
FIG. 10 is a graph for explaining quality calculation, trigger condition determination, and quality report by a terminal according to Embodiment 2 of the claimed invention.

The operation of terminal 100 of Embodiment 2 having the above-mentioned configuration will be described. FIG. 10 is a graph for explaining quality calculation, trigger condition determination, and quality report by terminal 100. In FIG. 10, cells #A to C are cells to which no CoMP is applied, and cells #D to F are cells belonging to the same CoMP quality calculation target group.

<Quality Calculation>

Non-CoMP quality calculation section 104 measures the quality (e.g., RSRP or RSRQ) of the serving cell and neighboring cells on a per cell basis, on the basis of the control information received from measurement configuring section 103.

CoMP quality calculation section 105 calculates, for each of the cells forming the CoMP quality calculation target group, the quality (e.g., RSRP or RSRQ) taking into consideration the quality improvement effect by CoMP, on the basis of the control information received from measurement configuring section 103. CoMP quality calculation section 105 measures the quality (e.g., RSRP or RSRQ) of each of the plurality of cells forming the group indicated by the CoMP quality calculation target group identification information included in the control information received from measurement configuring section 103. CoMP quality calculation section 105 then calculates the "comprehensive quality" (i.e., CoMP quality) for the CoMP quality calculation target group, based on the quality results measured for the cells.

Specifically, CoMP quality calculation section 105 measures the quality (e.g., RSRP or RSRQ) of each of the plurality of cells forming the group indicated by the CoMP quality calculation target group identification information included in the control information received from measurement configuring section 103, and calculates the "comprehensive quality" by adding an offset value to each of the quality results measured for the cells.

In Embodiment 2, the offset value is set to a value satisfying expression 1 so that the quality of a cell at least satisfying the quality required for receiving the control signal of each cell is reported.

[1]

$$\text{offset} \leq \text{Non-CoMP threshold} - \text{quality required for receiving control signal} \quad \text{(Expression 1)}$$

<Trigger Condition Determination>

Measurement control section 106 determines whether or not the comprehensive quality value received from CoMP quality calculation section 105 exceeds the Non-CoMP threshold. In other words, the trigger condition for transmitting the Non-CoMP quality of a plurality of cells included in the CoMP quality calculation target group is that the comprehensive quality value received from CoMP quality calculation section 105 exceeds the Non-CoMP threshold. In more detail, the trigger condition for transmitting the Non-CoMP quality of the cells included in the CoMP quality calculation target group is that at least one value in the group of added values each obtained by adding an offset value to the Non-CoMP quality of a corresponding one of the plurality of cells included in the CoMP quality calculation target group exceeds the Non-CoMP threshold. In FIG. 10, the CoMP quality for cells #D to F also exceeds the Non-CoMP threshold and therefore the trigger condition is satisfied. In addition, since the quality of cell #A also exceeds the Non-CoMP threshold, the trigger condition is satisfied for transmitting Non-CoMP quality for the cell to which Non-CoMP is not applied.

<Quality Report>

If the trigger condition is satisfied, measurement control section 106 transmits the Non-CoMP quality of at least one of a plurality of cells included in the CoMP quality calculation target group. The above-mentioned trigger condition is satisfied when at least one value in the group of added values each obtained by adding an offset value to the Non-CoMP quality of a corresponding one of the plurality of cells included in the CoMP quality calculation target group exceeds the Non-CoMP threshold. In the situation shown in FIG. 10, first of all, the quality of cell #A exceeds the Non-CoMP threshold and therefore the quality is reported from terminal 100 to base station 200. Furthermore, the CoMP quality for cells #D to F also exceeds the Non-CoMP threshold and therefore the Non-CoMP quality of at least one of cells #D to F is also reported from terminal 100 to base station 200.

In this case, all of the plurality of cells included in the CoMP quality calculation target group may be target cells of Non-CoMP quality transmission. Accordingly, base station 200 can select a handover destination cell from among the plurality of cells included in the CoMP quality calculation target group, taking the traffic condition into account.

In addition, part of a plurality of cells included in the CoMP quality calculation target group may be target cells of Non-CoMP quality transmission. For example, only the cell having the highest Non-CoMP quality among the plurality of cells included in the CoMP quality calculation target group may be target cells of Non-CoMP quality transmission. Accordingly, base station 200 can handover terminal 100 to the cell having the best quality in the CoMP group.

In addition, measurement control section 106 may transmit the CoMP quality of the CoMP quality calculation target group, besides the Non-CoMP quality thereof. Accordingly, base station 200 can recognize not only that the CoMP quality exceeds the threshold but also the absolute value of the quality.

According to Embodiment 2 as described above, CoMP quality calculation section 105 in terminal 100 calculates, as the comprehensive quality value, the group of added values by adding a predetermined offset value to the quality value of each of the received reference signals corresponding to the quality calculation target group. When at least one value in the group of added values exceeds the Non-CoMP threshold, measurement control section 106 transmits the quality of the reference signal transmitted from at least one of the plurality of cells included in the quality calculation target group to the serving cell in communication (i.e., base station 200).

(Other Embodiments)

Figure 11:
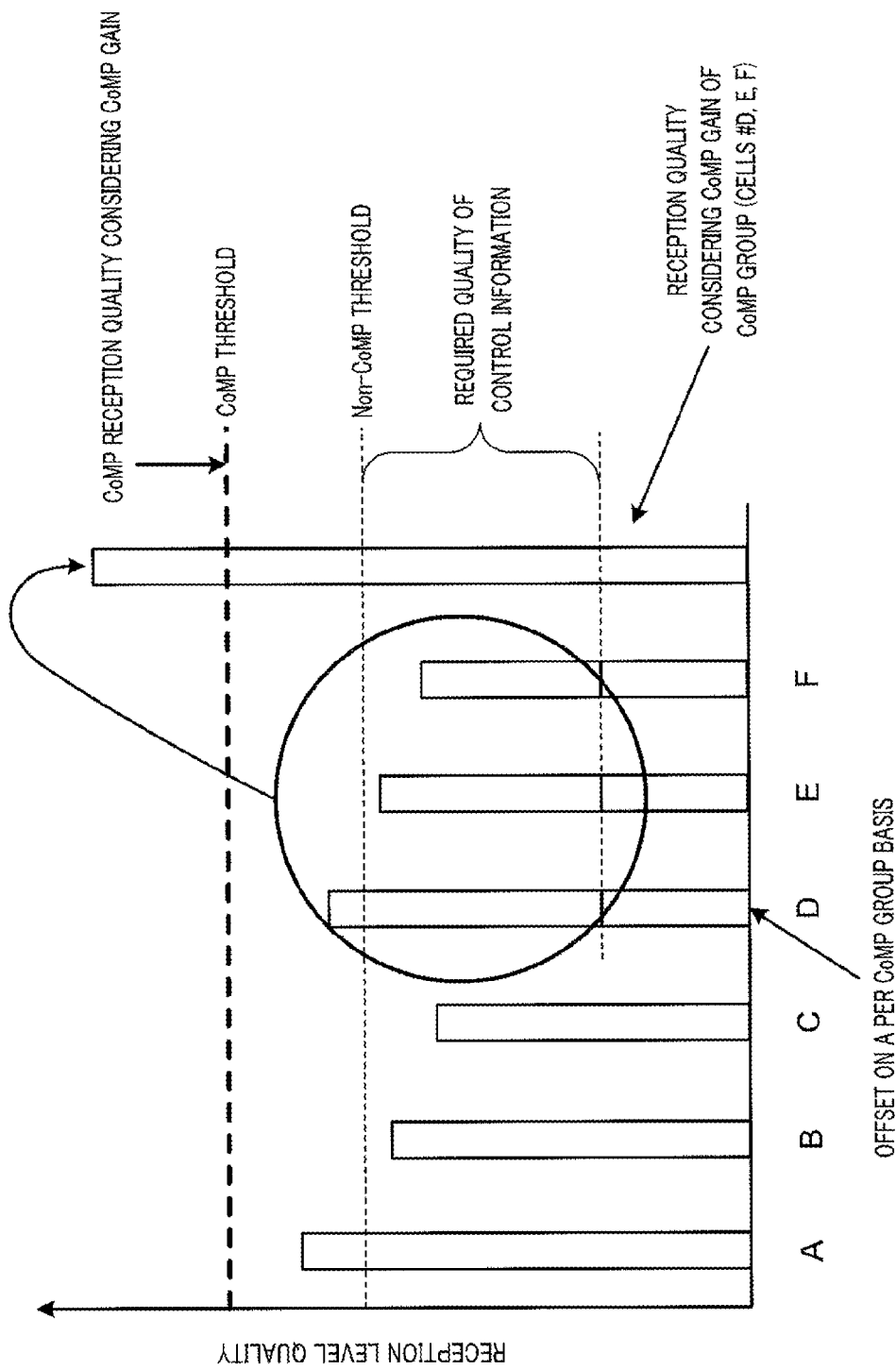
FIG. 11 is a graph for explaining a trigger condition of another Embodiment (1).

(1) It is also possible to combine Embodiments 1 and 2. That is, as shown in FIG. 11, the trigger condition may be such that the comprehensive quality value exceeds the CoMP threshold while at least one value in the group of added values exceeds the Non-CoMP threshold. Accordingly, terminal 100 can report more accurate CoMP quality to base station 200, while maintaining the quality of the control signal in the handover destination. Note that, the comprehensive quality value described above is calculated based on the combined signal obtained by combining the reference signals received from the CoMP quality calculation target group. In addition, the group of added values described above is obtained by adding an offset value to the Non-CoMP quality of the plurality of cells included in the CoMP quality calculation target group.

Note that, the trigger condition may also be such that the comprehensive quality value calculated based on the combined signal obtained by combining the reference signals received from the CoMP quality calculation target group exceeds the CoMP threshold, while at least one value in the group of added values each obtained by adding an offset value to the Non-CoMP quality of a corresponding one of the plurality of cells included in the CoMP quality calculation target group exceeds the "CoMP threshold." A similar effect is obtained by setting the offset value to a value satisfying expression 2 so that the quality of a cell at least satisfying the quality required for receiving the control signal of each cell is reported.

[2]

$$\text{offset} \leq \text{CoMP threshold} - \text{quality required for receiving control signal} \quad \text{(Expression 2)}$$

(2) Although Non-CoMP quality calculation section 104 and CoMP quality calculation section 105 are described as separate functional units in the aforementioned embodiments, the claimed invention is not limited to this case, and thus each of the sections may be a single function unit.

(3) Although the CoMP quality calculation target group is described as being identical to the CoMP group in the aforementioned embodiments, the claimed invention is not limited to this case, and thus the CoMP quality calculation target group may be formed by part of the plurality of cells forming the CoMP group. In other words, a CoMP group set may include, as a part thereof, a CoMP quality calculation target group set. That is, the CoMP quality estimation target group may be a subset of the CoMP group (e.g., CoMP measurement set or RRM (Radio Resource Management) measurement set defined in NPL 3 (TR36.814 V2.0.0)). In addition, the CoMP quality calculation target group may be notified to the terminal as cells, or may be notified to the terminal as a CSI (Channel State Information)-RS (Reference Signal) of the quality measurement target. In the latter case, the CoMP quality calculation target group may be a list of CSI-RS measurement candidates.

In this case, for example, the CoMP quality calculation target group may include, as components thereof, only the cells for which the difference between the maximum quality value among a plurality of cells included in a CoMP group and the quality of each of the cells included in the CoMP group falls within a predetermined value. Alternatively, the CoMP quality calculation target group may include, as components thereof, only the cells for which the difference between the quality of the serving cell included in the CoMP group and the quality of each of the cells included in the CoMP group falls within a predetermined value. Alternatively, the CoMP quality calculation target group may include, as components thereof, only the top N cells having high quality among a plurality of cells included in the CoMP group (where N is a natural number equal to or larger than 2 and is a parameter preliminarily set for terminal 100 by base station 200).

In addition, base station 200 may regard the CoMP quality calculation target group as a unit for applying CoMP. In CoMP, the resource consumption per terminal increases as the number of cells performing coordinated increases. Accordingly, a problem arises that, if there are too many coordinated cells, although the performance of the terminals to which CoMP is applied improves, the resources available for other terminals decrease, which results in a decrease in the average cell throughput. In contrast, making the CoMP quality calculation target group and the unit of applying CoMP smaller than the CoMP group allows CoMP quality to be reported only when a predetermined quality is obtained with a small number of coordinated cells while preventing an excessive increase in the number of coordinated cells at the time of CoMP application. Note that, the unit of a CoMP application target may be referred to as CoMP transmission point(s).

(4) Although the CoMP threshold is assumed to be different from the Non-CoMP threshold in Embodiment 1, the claimed invention is not limited to this case, and thus the Non-CoMP threshold may be used as the CoMP threshold. This configuration can achieve appropriate handover control even if a cell group in which a plurality of cells performs downlink communication in a coordinated manner is included in a communication system. However, as described above, setting the CoMP threshold separately besides the Non-CoMP threshold allows the Non-CoMP quality of a CoMP quality calculation target group to be transmitted only when a large transmission characteristic improvement effect is expected by using CoMP.

(5) Although only the Non-CoMP threshold is used in Embodiment 2, the claimed invention is not limited to this case, and thus the CoMP threshold may be different from the Non-CoMP threshold as with Embodiment 1.

(6) In Embodiment 1 and another embodiment (5), the value set as the CoMP threshold may vary according to the number of cells forming the CoMP quality calculation target group. In other words, a larger value is set for the CoMP threshold as the number of cells forming the CoMP quality calculation target group increases. Base station 200 may preliminarily configure terminal 100 with the CoMP threshold according to the number of cells forming the CoMP quality calculation target group, or may preliminarily configure terminal 100 with an expression to calculate the CoMP threshold according to the number of cells forming the CoMP quality calculation target group.

In this manner, terminal 100 provided with a smaller number of cells forming the CoMP quality calculation target group configured by base station 200 reports the quality on a priority basis, so that handover to a cell expected to exhibit a performance improvement effect by CoMP is realized. Thus, the resource usage efficiency can be improved.

(7) In Embodiment 1 and another embodiment (5), the CoMP threshold may be switched based on the scheme of CoMP to be applied. Specifically, the CoMP threshold may be switched according to whether the scheme of CoMP to be applied is DCS or JT. The value of the CoMP threshold used when the scheme of CoMP to be applied is JT is larger than the value of the CoMP threshold when the scheme of CoMP to be applied is DCS. In other words, the CoMP quality takes a different value since the number of cells transmitting data is different between DCS and JT (i.e., the quality for JT is higher than the quality for DCS). Therefore, making the CoMP threshold used when the scheme of CoMP to be applied is JT coincide with the CoMP threshold used when the scheme of CoMP to be applied is DCS, on the basis of a value suitable for the quality corresponding to DCS may raise a problem in that reports frequently occur in the case of JT. On the contrary, making the thresholds coincide with each other on the basis of a value suitable for the quality corresponding to JT results in no report occurring in the case of DCS, so that the base station cannot recognize the quality. Therefore, the CoMP threshold is switched herein according to whether the scheme of CoMP to be applied is DCS or ST. Note that, since DCS is a scheme in which the number of base stations 200 transmitting data at any timing is always one, the CoMP threshold used when the scheme of CoMP to be applied is DCS may be set to the same value as the Non-CoMP threshold.

(8) Although the aforementioned embodiments have been described assuming that measurement is performed on a per cell basis, measurement may be performed on a per transmission point basis. Note that a transmission point may be distinguished according to a CSI-RS. In other words, a measurement target cell can be interpreted as a measurement target CSI-RS.

(9) The embodiments of the claimed invention described above are provided as hardware. The claimed invention can be achieved through software in cooperation with hardware, however.

The functional blocks described in the embodiments are achieved by an LSI, which is typically an integrated circuit. The functional blocks may be provided as individual chips, or part or all of the functional blocks may be provided as a single chip. Depending on the level of integration, the LSI may be referred to as an IC, a system LSI, a super LSI, or an ultra LSI.

In addition, the technique of circuit integration is not limited to the LSI and may be realized by a dedicated circuit or a general-purpose processor. An FPGA (Field Programmable Gate Array) which can be programmed after fabrication of the LSI, or a reconfigurable processor which can reconfigure connection and setting of the circuit cell inside the LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosure of Japanese Patent Application No. 2011-017932, filed on Jan. 31, 2011, including the specification, drawings and abstract, is incorporated herein by reference in its entirety.

Industrial Applicability

The terminal and quality transmission method of the claimed invention are useful in that they can achieve appropriate handover control even if a cell group in which a plurality of cells performs downlink communication in a coordinated manner is included in a communication system.

Reference Signs List

100 Terminal
101,204 Receiving section
102,205 Reception processing section
103,201 Measurement configuring section
104 Non-CoMP quality calculation section
105 CoMP quality calculation section
106 Measurement control section
107,202 Transmission processing section
108,203 Transmitting section
200 Base station
206 Report information extraction section
207 Handover control section

The invention claimed is:

1. A quality transmission method comprising:
  receiving a reference signal transmitted from a quality calculation target group including all or part of a plurality of cells forming a cell group that transmits downlink data in a coordinated manner, and a reference signal transmitted from a cell not transmitting downlink data in a coordinated manner;
  calculating a comprehensive quality value for the quality calculation target group on the basis of the received reference signal, and a quality value on a per cell basis on the basis of the reference signal transmitted from the cell not transmitting downlink data in a coordinated manner; and
  transmitting, to a cell in communication, information on quality of the reference signal transmitted from at least one of a plurality of cells included in the quality calculation target group, when the calculated comprehensive quality value exceeds a first threshold and information on the quality value on a per cell basis, when the calculated quality value on a per cell basis exceeds a second threshold, wherein
  the first threshold is larger than the second threshold.

2. The quality transmission method according to claim 1, wherein
  the comprehensive quality value is a plurality of added values each calculated by adding a predetermined offset value to a quality value of a reference signal of each of a plurality of cells included in the quality calculation target group, and
  transmitting, to the cell in communication, information on quality of the reference signal transmitted from at least one of the plurality of cells included in the quality calculation target group, when at least one of the plurality of added values exceeds the first threshold.

3. A terminal comprising:
  a receiving section that receives a reference signal transmitted from a quality calculation target group including all or part of a plurality of cells forming a cell group that transmits downlink data in a coordinated manner, and a reference signal transmitted from a cell not transmitting downlink data in a coordinated manner;
  a calculating section that calculates a comprehensive quality value for the quality calculation target group on the basis of the received reference signal, and a quality value on a per cell basis on the basis of the reference signal transmitted from the cell not transmitting downlink data in a coordinated manner; and
  a transmitting section that transmits, to a cell in communication, information on quality of the reference signal transmitted from at least one of a plurality of cells included in the quality calculation target group, when the calculated comprehensive quality value exceeds a first threshold, and information on the quality value on a per cell basis, when the calculated quality value on a per cell basis exceeds a second threshold, wherein
  the first threshold is larger than the second threshold.

4. The terminal according to claim 3, wherein the comprehensive quality value is calculated based on a combined signal obtained by combining reference signals of a plurality of cells included in the quality calculation target group.

5. The terminal according to claim 3, wherein
  the comprehensive quality value is a plurality of added values each calculated by adding a predetermined offset value to a quality value of a reference signal of each of a plurality of cells included in the quality calculation target group, and
  the transmitting section transmits, to the cell in communication, information on quality of the reference signal transmitted from at least one of the plurality of cells included in the quality calculation target group, when at least one of the plurality of added values exceeds the first threshold.

6. The terminal according to claim 3, wherein the first threshold is changed according to the number of cells included in the quality calculation target group.

7. The terminal according to claim 3, wherein the first threshold is switched according to whether a coordinated transmission scheme of the cell group is a first system that transmits the downlink data while sequentially switching between cells, or a second system that simultaneously transmits the downlink data by a plurality of cells.

8. A terminal comprising:
  a receiving section that receives a reference signal transmitted from a quality calculation target group including all or part of a plurality of cells forming a cell group that transmits downlink data in a coordinated manner;
  a calculating section that calculates a comprehensive quality value for the quality calculation target group on the basis of the received reference signal; and
  a transmitting section that transmits, to a cell in communication, information on quality of the reference signal transmitted from at least one of a plurality of cells included in the quality calculation target group, when the calculated comprehensive quality value exceeds a first threshold, wherein
  the comprehensive quality value is a plurality of added values each calculated by adding a predetermined offset value to a quality value of a reference signal of each of a plurality of cells included in the quality calculation target group, and the transmitting section transmits, to the cell in communication, information on quality of the reference signal transmitted from at least one of a plurality of cells included in the quality calculation target group, when at least one of the plurality of added values exceeds the first threshold.

9. The terminal according to claim 8, wherein
the receiving section further receives a reference signal transmitted from a cell not transmitting downlink data in a coordinated manner,
the calculating section further calculates a quality value on a per cell basis on the basis of the reference signal transmitted from the cell not transmitting downlink data in a coordinated manner,
the transmitting section transmits information on the quality value on a per cell basis, when the calculated quality value on a per cell basis exceeds a second threshold, and
the first threshold is larger than the second threshold.

10. A quality transmission method comprising:
receiving a reference signal transmitted from a quality calculation target group including all or part of a plurality of cells forming a cell group that transmits downlink data in a coordinated manner;
calculating a comprehensive quality value for the quality calculation target group on the basis of the received reference signal; and
transmitting, to a cell in communication, information on quality of the reference signal transmitted from at least one of a plurality of cells included in the quality calculation target group, when the calculated comprehensive quality value exceeds a first threshold, wherein the comprehensive quality value is a plurality of added values each calculated by adding a predetermined offset value to a quality value of a reference signal of each of a plurality of cells included in the quality calculation target group, and
transmitting, to the cell in communication, information on quality of the reference signal transmitted from at least one of a plurality of cells included in the quality calculation target group, when at least one of the plurality of added values exceeds the first threshold.

11. The quality transmission method according to claim 10, wherein
receiving a reference signal transmitted from a cell not transmitting downlink data in a coordinated manner,
calculating a quality value on a per cell basis on the basis of the reference signal transmitted from the cell not transmitting downlink data in a coordinated manner, and
transmitting information on the quality value on a per cell basis, when the calculated quality value on a per cell basis exceeds a second threshold, and
the first threshold is larger than the second threshold.

* * * * *